(12) United States Patent
Berestov

(10) Patent No.: US 6,865,289 B1
(45) Date of Patent: Mar. 8, 2005

(54) DETECTION AND REMOVAL OF IMAGE OCCLUSION ERRORS

(75) Inventor: Alexander Berestov, San Jose, CA (US)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/500,181

(22) Filed: Feb. 7, 2000

(51) Int. Cl.[7] .............................. G06K 9/00; G06K 9/62; G06K 9/32; G01C 3/14; G01B 11/14
(52) U.S. Cl. ..................... 382/154; 382/209; 382/294; 356/12; 356/623
(58) Field of Search ................................ 382/154, 294, 382/209; 356/12–14, 611, 623, 631; 250/559.23, 559.31; 348/47; 600/116

(56) References Cited

U.S. PATENT DOCUMENTS

| | | | | |
|---|---|---|---|---|
| 4,745,562 A | * | 5/1988 | Prazdny .......................... | 702/71 |
| 4,825,393 A | * | 4/1989 | Nishiya .......................... | 702/152 |
| 5,202,928 A | * | 4/1993 | Tomita et al. .................. | 382/154 |
| 5,220,441 A | * | 6/1993 | Gerstenberger ............... | 358/487 |
| 5,727,078 A | * | 3/1998 | Chupeau ......................... | 382/154 |
| 5,768,404 A | * | 6/1998 | Morimura et al. ............. | 382/107 |
| 5,818,959 A | * | 10/1998 | Webb et al. .................... | 382/154 |
| 5,867,591 A | * | 2/1999 | Onda .............................. | 382/154 |
| 5,917,962 A | * | 6/1999 | Chen et al. .................... | 382/291 |
| 6,005,987 A | * | 12/1999 | Nakamura et al. ............ | 382/294 |
| 6,028,954 A | * | 2/2000 | Tomita et al. .................. | 382/154 |
| 6,078,701 A | * | 6/2000 | Hsu et al. ....................... | 382/294 |
| 6,128,416 A | * | 10/2000 | Oura .............................. | 382/284 |
| 6,141,440 A | * | 10/2000 | Melen ............................ | 382/154 |

FOREIGN PATENT DOCUMENTS

| | | | |
|---|---|---|---|
| JP | 3182976 | * | 8/1991 |
| JP | 5122606 | * | 5/1993 |
| JP | 409251538 A | * | 9/1997 |

OTHER PUBLICATIONS

Mohammed Eziza et al., Estimation and Segmentation of a dense Disparity Map For 3D Reconstruction, Proc. ICASSP '00, Istaubul, Turkey 2000.*

Tateda et al., Integration of Overlapping Maps Made by Stereo Vision Using View Field Information, Aug. 1994, IEEE, vol. 24 Issue 8, pp. 1273–1279.*

Yogesan, K., Eikelboom, R., and Barry, C. Colour Matching of Serial Retinal Images. Lions Eye Institute and Centre for Ophthalmology and Visual Science [online], Feb. 1999 [retrieved on Jun. 27, 2000]. Retrieved from the Internet:<URL: http://www.general.uwa.edu.au/u/robeik/OSA99/>.

Woods, A. et al;. *Image Distortions in Stereoscopic Video Systems*, SPIE vol. 1915 Stereoscopic Displays and Applications, pp 36–48, IV (1993).

* cited by examiner

*Primary Examiner*—Daniel Miriam
*Assistant Examiner*—Shefali Patel
(74) *Attorney, Agent, or Firm*—Fitzpatrick, Cella, Harper & Scinto

(57) ABSTRACT

A system, method, and computer-readable medium for detecting and eliminating correspondence errors associated with image occlusions. In a first embodiment of the invention, the method applies traditional correspondence methods for matching points in two images, a left image (FIG. 1A) and a right image (FIG. 1B), taken of the same scene. The method applies the correspondence method to locate a matching a point (310) in the right image (FIG. 1B) with a "best match" point (320) in the left image (FIG. 1A). A set of matching points (310, 320) is generated. A second search is then performed by using the best match point (320) in the right image (FIG. 1B) as the basis for an additional correspondence search in the left image (FIG. 1A). The range of match candidates in the second search is such that points to the left of the starting point (310) are not tested as match candidates. The point (330) generated in the second search may be the same point (310) that was used in the first search or may be a different point altogether. The results of the second search are selected as the match candidates.

23 Claims, 8 Drawing Sheets

DETECTION AND REMOVAL OF IMAGE OCCLUSION ERRORS

RELATED APPLICATION

The subject matter of this application is related to the subject matter of a commonly owned U.S. patent application Ser. No. 09/428,286, titled "Fast Epipolar Line Adjustment of Stereo Pairs," filed on Oct. 27, 1999, also by Alexander Berestov, the contents of which are incorporated by reference as if fully disclosed herein.

BACKGROUND OF THE INVENTION

1. Field of the Invention

This invention is related to image processing techniques. More specifically, this invention is a system, method, and computer-readable medium for removing stereo matching errors caused by image occlusions.

2. Related Art

A stereo matching algorithm, which can produce a dense and sharp depth map as an active range finder, is a key technology for many stereo applications including object recognition, three-dimensional object modeling, vehicle navigation, and geometric inspection. In order to generate a three-dimensional map or image of a scene, however, different images of the scene must be matched properly. One of the major problems to properly matching points in the images is caused when occluding contours coincide. Occluding contours coincide when a point, which is visible in the right image, is not visible in the left image and therefore does not really have a matching point. Alternatively, occluding errors can also occur at the borders or edges of an object that are captured by a camera facing the object at different angles (called "occluding boundaries"). This is caused by the traditional correspondence procedure which will be described in further detail below.

The most standard situation where occluding contours occur is when other objects in the scene block the point of interest. When this occurs, area-based matching algorithms often give wrong disparity estimates near the contour. When the classical stereo correlation technique is applied and the search is made in the left image, the contour usually "leaks" to the right of the object boundary as illustrated in FIG. 2. Another set of errors are shown in the top left corner of FIG. 2 and are associated with out-of-focus objects that cannot be matched correctly. The present invention resolves each of these problems.

The prior art solutions used to successfully detect occlusions and avoid false correspondence require three or more cameras. In the simplest case, several cameras may be used to capture an image of the scene from equal angles along a hemisphere that surrounds the scene. Thus, if a point is not included in the second image, the first image may be matched to the third image and used to "complete" the occluded area in the second image. If not positioned properly, however, multiple camera stereos can increase the area of occlusion and may still lead to false correspondence. More specifically, depth maps generated from a polynocular stereo image often have blurred object shapes caused by the false correspondence at occluding boundaries.

Another set of solutions involved creative manipulation of a matching algorithm. Some matching algorithms may be better at avoiding false correspondence problems, but none solves the problem completely. For example, feature-based matching algorithms, which try to correspond points only at object edges, may be used to avoid occlusion to an extent. Other binocular stereo algorithms have also been adapted to try to detect "half-occluded" regions in order to improve the correspondence search. In both cases, however, the algorithms fail to measure the depth in these regions. More recently, new algorithms were developed for multiple camera devices, which may provide better results in occlusion detection.

In each prior art solution, either multiple cameras are needed to prevent occluded regions or the method is extremely time intensive and, in both cases, the resulting correspondence errors prevent creation of a complete depth map of the scene. Using multiple cameras increases the cost, burden and complexity of the imaging system, and the resulting images are still not amenable to depth analysis. What is needed, then, is a new method for detecting and eliminating occlusions and out-of-focus errors thereby enabling the creation of an accurate depth map of the scene without requiring significant time and effort to accomplish.

DISCLOSURE OF INVENTION

A system and method for detecting and eliminating correspondence errors associated with image occlusions is provided. In a first embodiment of the invention, the method first applies traditional correspondence methods for matching points in two images, a left image 1A and a right image 1B, taken of the same scene. Ideally, the initial search is performed by matching each point (310) in the right image 1B with a "best match" point (320) in the left image 1A. Once an initial set of matching points (310, 320) is generated, a second search is performed by using the best match point (320) in the right image 1B as the basis for an additional correspondence search in the left image 1A. While the first search was performed without restriction, the second search is explicitly limited by the starting point (310) used in the first search. A second "best match" point (330) is generated. The point (330) generated in the second search may be the same point (310) that was used in the first search or may be a different point altogether. This results in a second set of points that represents the most accurate match between points.

As will be further described below with reference to FIG. 3, limiting the search window on the second search results from the way in which occlusions manifest themselves as errors during correspondence. More specifically, incorrectly matched points often cause leakage in a particular direction depending on the direction of image used in the first search. If the initial points used in the first search are points in the right image 1B being matched to the "left" image 1A, then the first search will generate good matches for points on the left edge of objects in the image, with a poor match on the right edge of the object. In this scenario, the second search will generate good matches for points on the right edge of any objects in the image. By placing the additional limitations on the second correspondence search, the poor match points on the left side of the object will be avoided while still picking up the correctly selected correspondence points on the right edge of the object. This limitation also speeds up the correspondence process significantly, as only a portion of the points in the row: is used during the correspondence search. Thus, the best points from each of the searches are used to establish correspondence in the fastest possible fashion.

In a second embodiment of the invention, the restrictions placed on the second search are removed and the resulting points used to accurately identify the occluded areas. These results may be used in conjunction with the results of the first embodiment to generate an error map that accurately identifies potentially problematic areas. More specifically, the results of correspondence search in the second embodiment avoid any "false positives" and can be used to further modify the results of the first embodiment.

Steps for removing any additional errors in the final images are also provided. For example, each stereo image could be broken down into separate images for each color coordinate. The correspondence search could be run on each image separately with the results used to create a separate disparity map for each color coordinate.

BRIEF DESCRIPTION OF THE DRAWINGS

FIGS. 4A, 4B: and 4C into a single image;

DETAILED DESCRIPTION OF THE PREFERRED EMBODIMENTS

Figure 1A:
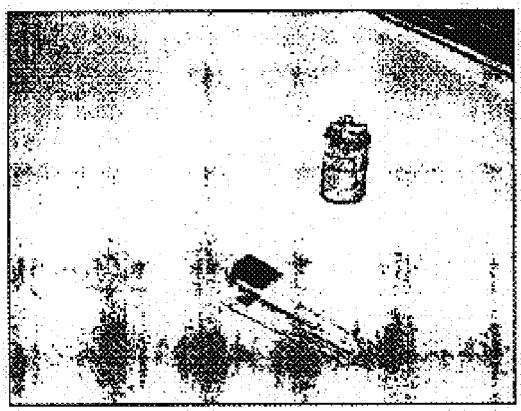
FIGS. 1A and 1B comprise a pair of images taken of a scene that includes a can and stapler, and will be used to demonstrate the present invention.

The present invention can be used in conjunction with any number of different visual capture devices including video cameras, video capture devices on personal computers, standard photographic cameras, specialty stereo imaging cameras, or digital cameras. The present specification describes the invention as being used in conjunction with standard photographic cameras, for illustration purposes only.

The standard still-frame camera is normally used to capture an image of a scene or object. When the picture is taken, however, the image of the scene is "flattened" from three dimensions to two dimensions resulting in the loss of information, such as spatial size and the spatial relations among objects in the image. One way of replacing the lost information is to take two or more images of the same object from different angles, called stereo images, and to extrapolate the spatial information accordingly. In order to combine the images properly, however, portions of the first image 1A must be corresponded to the relevant portions in the second image 1B. Once the images 1A, 1B have been matched, the image information may be used to calculate the epipolar geometry by extracting the essential matrix of the system. The three-dimensional Euclidean structure of the imaged scene can then be computed in the form of a disparity map or other three-dimensional representation.

In the ideal case, the epipolar lines of the two images are horizontal. In order to guarantee horizontal epipolar lines, however, it is necessary to set the optical axes of the two cameras in parallel. For instance, calibration can be used to guarantee that the optical axes are parallel, the base line is horizontal, the sensors, which are used to create the image, coincide, and that the cameras have the same lens distortion. If any of these factors are incorrectly calibrated, however, the points in the first image 1A may not have matching points lying along the same row in the second image 1B.

Matching points in one image 1A with points in another image 1B where both images are taken of a single scene, called the correspondence problem, remains one of the bottlenecks in computer vision and is important to continued development in this field. As is more fully described in the related application entitled "Fast Epipolar Adjustment of Stereo Pairs" (identified above), an adjustment algorithm can be used to adjust the points in the right image 1B in order to more easily correspond to the points in the left image 1A, so that the points in the right image 1B are located along the same line as in the left image 1A, thereby creating images with the desired epipolar geometry. For simplicity, we shall assume that the images 1A, 1B already have the desired geometry or that the adjustment algorithm has already been run on the images.

As an initial matter, the following is a description of the classical stereo search that is used to establish match candidates in one embodiment of the present invention. While this matching algorithm will be used to illustrate one embodiment, those skilled in the art will realize that other matching algorithms may also be used to implement the present invention.

As an initial matter, for a selected point in a first image, a correlation window centered on that selected point is created. The correlation window may be of any size, but a larger window will yield less precise results than a smaller window. The value of one or more properties of the area within the correlation window are then calculated. For example, the matching algorithm may use the amount of red values in the points within the correlation window as the relevant correlation property.

An equally sized correlation window is then centered on one or more points within a search window in the second image. The values of one or more correlation properties of areas within the correlation window of the second image are then calculated. Each point within the search window in the second image is given a correlation score based on its similarity to the properties of the correlation window of the first image.

A constraint on the correlation score can then be applied in order to select the most consistent matches: for a given couple of points to be considered as a match candidate, the correlation score must be higher than a given threshold, for example. Using the correlation technique, a point in the first image may be paired to several points in the second image and vice versa. Several techniques exist for resolving the matching ambiguities but, for simplicity, the points with the highest correlation score will be selected. In the preferred embodiment of the invention, this method will be applied to select the best match candidate. Although the described algorithm is the preferred technique for matching the points in the images, other matching algorithms may also be used including: correlation-based matching, MRF-based matching, feature-based matching, and phase-based matching.

Unfortunately, this classical correlation technique gives greater disparity values in areas close to the object boundaries, making boundary areas difficult to analyze. This is particularly true when using a smaller correlation window, as the colors in the window change dramatically when the border of the object is included in the search. Using larger correlation windows results in less precise results, however, meaning that all points in the image, not just object boundaries, may be improperly matched.

Figure 1B:
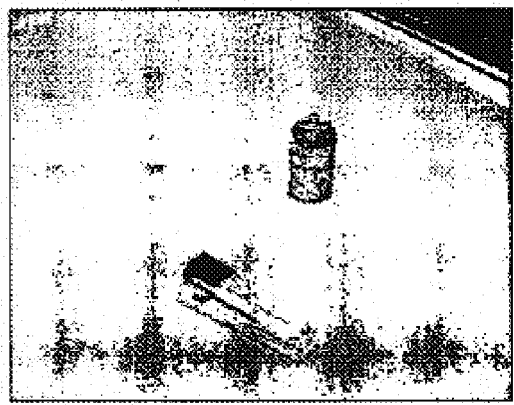

Referring now to FIGS. 1A and 1B, a pair of images taken of a scene (hereinafter referred to as the "stereo pair") including a can and stapler, is shown. This stereo pair 1A, 1B will be used throughout this description to illustrate the invention. This illustration is not meant to limit the scope of the invention. Any number of images may be used, and the number or size of the objects in the scene are inconsequential to the operation of the system and method.

Figure 2:
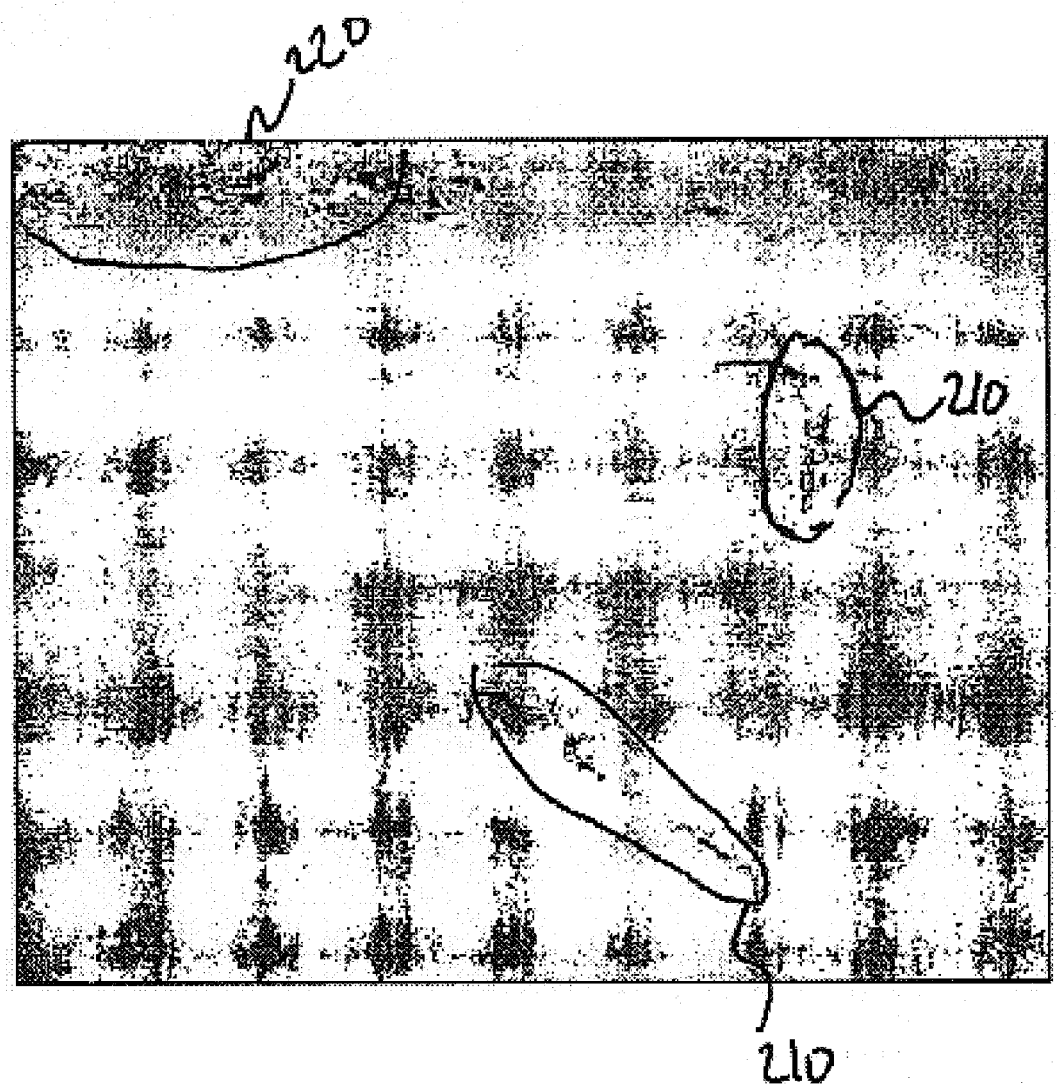
FIG. 2 is a disparity map of the scene that was created by combining FIGS. 1A and 1B using classical stereo matching algorithms.

Referring now to FIG. 2, a green color disparity map is shown. A green color disparity map is generated by examining only the green color in two images of a scene, using the resulting "green values" to establish a correspondence between the images, and using Euclidean geometry to determine the relative distance between a point in the scene and the location of the image capture device, such as a digital camera, used to capture the scene. In this example, the green disparity map was generated using the stereo pair from FIGS. 1A and 1B. Two other disparity maps, red and blue, (not shown) were also obtained from the images. Each of the disparity maps has the same features: occlusion errors (210) to the right of the objects and out-of-focus errors (220). These errors are generated by the traditional correspondence algorithms. This is caused by the fact that when matching points in the left image with points in the right image, the contours of the objects "leak" to the left of the object boundary. On the other hand, when matching points in the right image with one or more points in the left image, the contours of the objects "leak" to the right of the object boundary. The present invention uses these facts advantageously to prevent the leakage.

Figure 3:
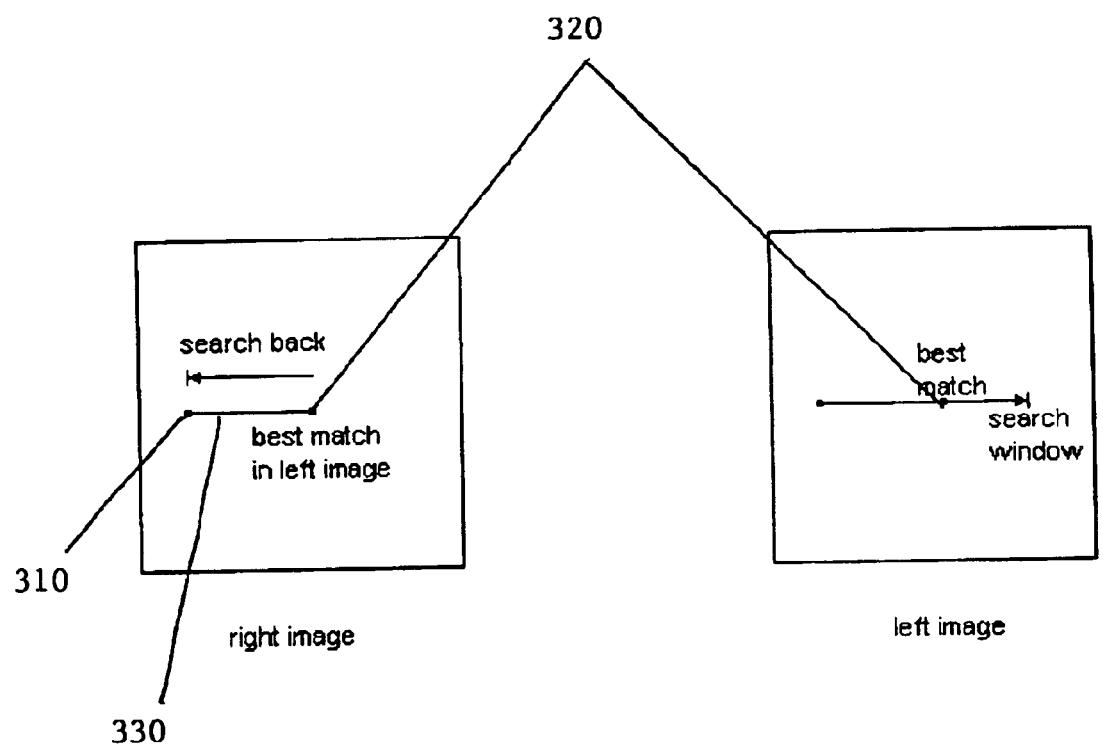
FIG. 3 is a block diagram that illustrates the stereo matching method of the present invention.

Referring now to FIG. 3, a diagram illustrating the operation of the method of the present invention is shown. The method starts by running the classical stereo correlation search described above. The correlation search uses a point (310) in the right image and searches for a best match in the left image. Once a best match point (320) is obtained in the left image, this point (320) is used as the basis for a second search that attempts to locate a best match for that point in the right image. In order to prevent leakage and to speed up the matching process, however, the correspondence algorithm does not attempt to match any points that are to the left of the original point (310) in the right image. This search may result in a second best match point (330) that is not equivalent to the original point (310). This process results in two point pairs for every point in the right image: a first pair of points (310, 320) that represents the best match between the original point (310) in the right image with a matching point (320) in the left image, hereinafter referred to as the "left pair"; and a second pair of points (320, 330) that represents the match between the matching point (320) located in the left image with a point (330) in the right image, hereinafter referred to as the "right pair".

In a first embodiment of the present invention, each of the resulting right pairs (320, 330) is used to establish a correspondence between the left and right image. The resulting correspondence between the images may then be used to create a stereo image or a disparity map.

This method was applied to the stereo pair 1A, 1B and used to correspond points in the images. The resulting red, green and blue color disparity map that were generated using the right pair (320, 330) of matching points are provided in FIGS. 4A, 4B, and 4C, respectively. While there are still errors in the correspondence (signified by the black patches in the images), the image boundaries (410, 420, 430) are sharper and can be determined with greater accuracy.

In sum, this method combines the best features of both searches. The left pair (310, 320) gives the incorrect results for the right boundary of the object search, resulting in a value which is greater than the true value. When we search back in the right image, however, the right pair (320, 330) picks the correct smaller disparity value, resulting in a proper match at the right boundary. On the other hand, the left pair (310, 320) gives the correct results for the left boundary of the object. Although using the right pair (320, 330) would normally result in greater disparity and improper correspondence, the second search is limited by the true smaller value from the first search, and therefore effectively uses the correct results as established by the left pair. Thus, the results of the second search pick the best point pairs at both boundaries.

Figure 5C:
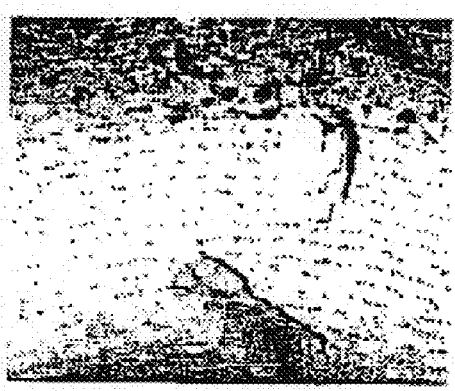
FIGS. 5A, 5B and 5C are individual color disparity maps that were generated using the second embodiment of the stereo matching method of the present invention.
Figure 5A:
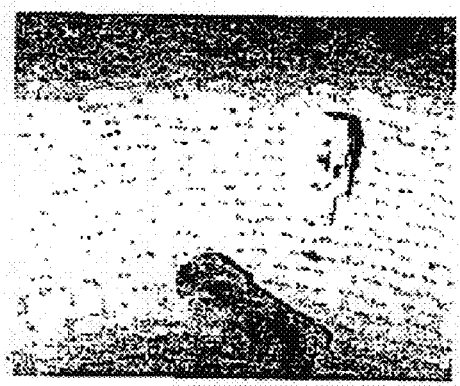
Figure 5B:
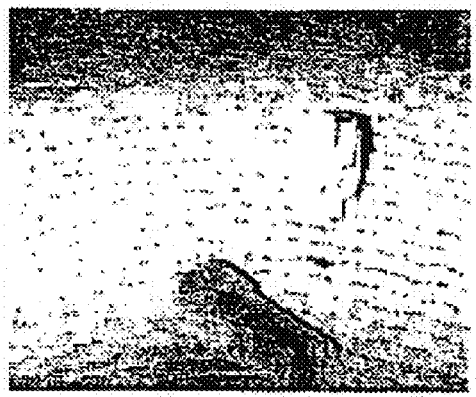

Additional embodiments of this invention can provide even better results. In a second embodiment, an additional step may be added to the first embodiment in order to help locate and remove errors in the correspondence. In this embodiment, if the search in the right image locates a different match point (330) than the original point (310), both points are considered erroneous and are replaced with a black point. Therefore, only the disparity values generated from both searches are considered accurate. As illustrated by the black portions in FIGS. 5A, 5B, and 5C, this embodiment results in fewer correct point values but provides more certainty for those values that it does correctly identify. FIG. 5B does contain numerous errors at the boundary (520), but errors can be modified or corrected. As explained with respect to FIG. 1 above, the classical correlation technique gives greater disparity in areas close to the object boundaries, making boundary areas difficult to analyze. Thus, unmodified application of the stereo correspondence process results in incorrectly matched points meaning that the user or process does not know that it needs to correct the errors. Knowledge of potentially erroneous areas, however, is a significant advantage in many vision applications where the erroneous areas can simply be avoided as potentially representing an object boundary. This method helps resolve that problem. In other words, the second embodiment is the preferred method for the elimination of false targets. The values generated by the second embodiment can also be filtered or used in combination with the results of the first embodiment to improve the results.

One benefit of this second embodiment is that it provides greater confidence in the accuracy of the points in the image. This can be of particular use in those applications where potentially unknown areas can simply be avoided. In machine vision applications such as robotics, for example, a moving robot can simply avoid black areas as potentially corresponding to an object that may prevent movement. This may lead to a more circuitous route, but is a better calculated choice when potentially expensive equipment is involved.

The results of the second embodiment could also be used in combination with the first embodiment to create a disparity confidence map. For example, the brightness of a particular pixel in the disparity map can be adjusted based on the second algorithm. All points in image 4A that correspond to potential erroneous points in image 5A could have a lower brightness value while "correct" points have a higher brightness value. Other applications and embodiments could also be developed using this error detection step.

Figure 4A:
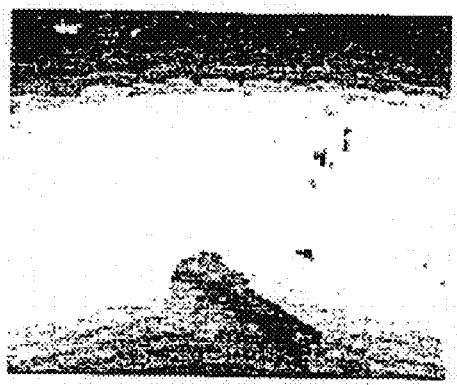
FIGS. 4A, 4B and 4C are individual color disparity maps that were generated using the first embodiment of the stereo matching method of the present invention.
Figure 4B:
Figure 4C:

A third embodiment that includes additional error correction steps is also provided. As illustrated in FIGS. 4A, 4B, and 4C, each image may be split into a separate disparity map corresponding to each color coordinate. In this case, the images 4A, 4B, 4C represent the Red, Green, Blue components disparity maps, respectively. While these color components are standard image components, other color coordinate systems may also be used. Regardless of the type of color coordinates used, the first step is to compare each point in the disparity maps that corresponds to each of the colors. Next, every point that has a value that matches the value of a point at that same location in at least one of the other disparity maps is selected. Any point value that is represented by only one color at a particular location is eliminated from the map. Points in the disparity maps which have different values across every color are flagged.

Once all erroneous areas have been identified, the errors may be eliminated using a simple filter or interpolation techniques. One alternative for eliminating erroneous points in disparity maps created using the first embodiment is to replace the erroneous value with the first accurate value to the right of the error point. In this alternative, the true value is selected from the right of the error point because it is common for the contour to leak to the right of the occlusion boundary.

Figure 6A:
FIG. 6A is a disparity map created by combining
Figure 6B:
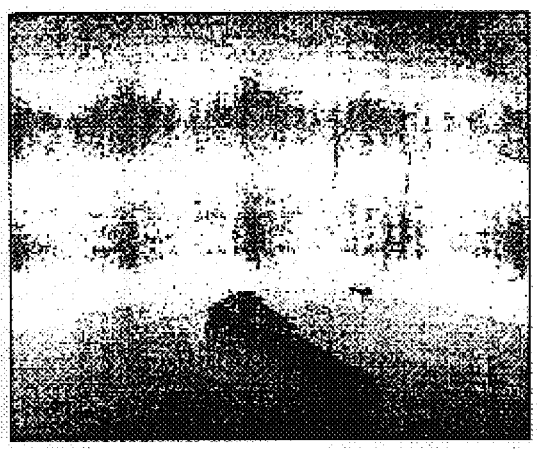
FIG. 6B is the disparity map of 5A that has been further improved by applying the additional error correction steps provided by the present invention.

Referring now to FIG. 6a, a combined disparity map created using the first embodiment of the present invention is shown. This map 6A was generated by combining FIGS. 4A, 4B and 4C without further modification. The results of applying the additional error elimination steps on the disparity map 6A, i.e., replacing erroneous entries with a first true value to the right of that point, are shown in FIG. 6B. As FIG. 6B demonstrates, the additional error filtering steps help create a vastly superior image resulting in an extremely accurate depiction of the can and stapler scene. The small remaining errors in FIG. 6B can be eliminated by applying well-known filtering or feature analysis algorithms.

Figure 7A:
FIG. 7A is a disparity map created by combining FIGS. 5A, 5B and 5C into a single image.
Figure 7B:
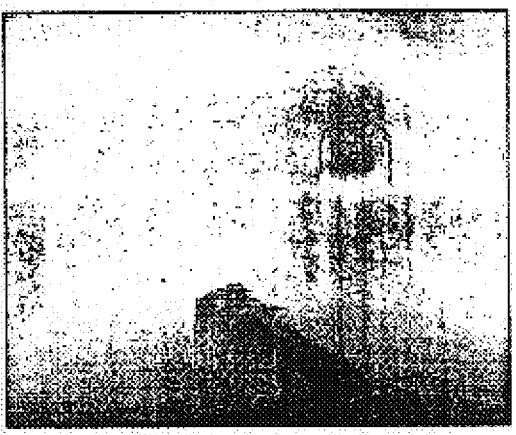
FIG. 7B is the disparity map of 7A that has been further improved by applying the additional error correction steps provided by the present invention.

Referring now to FIG. 7A, a combined disparity map generated using the second embodiment of the invention is shown. This map was generated by combining FIGS. 5A, 5B, and 5C without further modification. The results of applying the additional error elimination steps on the disparity map 7A, i.e., replacing erroneous entries with the first true value to the right of that point, is shown in FIG. 7B. As FIG. 7B further demonstrates, the additional steps help create a vastly superior image resulting in an extremely accurate depiction of the can and stapler scene. Additionally, despite the greater number of error points in FIG. 7A, the final result looks better than in FIG. 6B because false targets were detected more precisely during the correspondence search.

The additional error elimination steps are good for correcting both correspondence problems resulting from occlusions and out-of-focus errors. In areas that are out of focus, it is difficult to calculate exact disparity because there are no exact boundaries and the objects are blurred. In these cases, using either the first true value to the right of the error or interpolating a value using correct points to the left and right of the error point can result in significant improvement. The proposed algorithm can also be used with multiple cameras. It will probably reduce the number of cameras that are necessary for successful occlusion detection.

Figure 8:
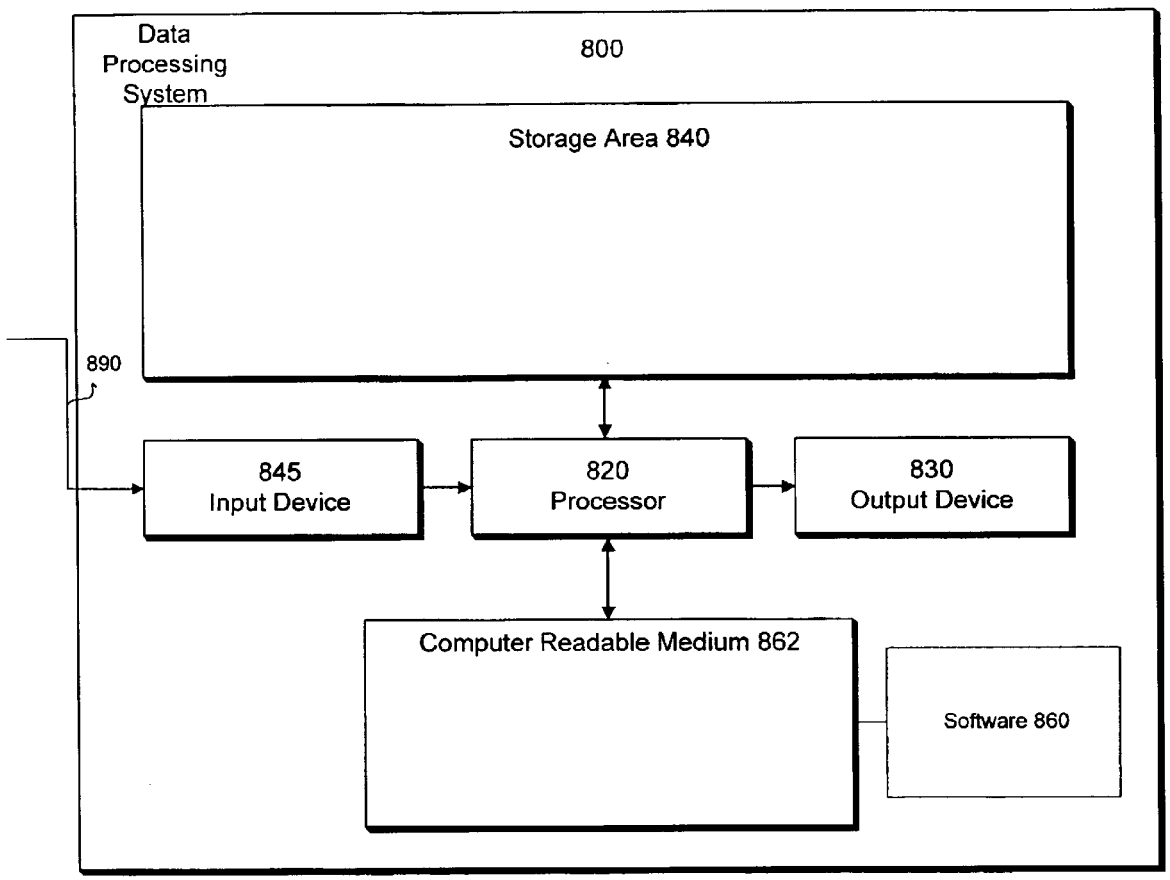
FIG. 8 is a block diagram of a computer system that may be used to implement the present invention.

FIG. 8 is a block diagram of a data processing system (800), which has at least one processor (820) and storage (840). Storage (840) of system (800) includes one or more images, software (860), and data structures used by the software to implement the invested method. The steps of the described embodiment of the present invention are performed when instructions of a computer program are performed by processor (820) (or another appropriate processor) executing instructions in storage (840).

System (800) also includes a network connection (890), which connects system (800) to a network such as the Internet, an intranet, a LAN, or a WAN. System (800) also includes an input device (845), such as a keyboard, touchscreen, mouse, or the like. System (800) also includes an output device (830) such as a printer, display screen, or the like. System (800) also includes a computer readable medium (862). Computer readable medium (862) can be any appropriate medium that has instructions, such as those of software (860), stored thereon. These interactions are loaded from computer readable medium (862) into storage area (840). Instructions can also be loaded into storage area (840) in the form of a carrier wave over network connection. Thus, the instructions and data in storage (840) can be loaded into storage via an input device 845, via a network, such as the Internet, a LAN, or a WAN, or can be loaded from a computer readable medium such as a floppy disk, CD ROM, or other appropriate computer readable medium (862). The instructions can also be downloaded in the form of a carrier wave over a network connection.

System (800) also includes an operating system (not shown). A person of ordinary skill in the art will understand that the storage/memory also contains additional information, such as application programs, operating systems, data, etc., which are not shown in the figure for the sake of clarity. It also will be understood that data processing system (800) (or any other data processing system described herein) can also include numerous elements not shown, such as additional data, software, and/or information in memory, disk drives, keyboards, display devices, network connections, additional memory, additional CPUs, LANs, input/output lines, etc.

Although the description above contains many detailed descriptions, these descriptions should not be construed as limiting the scope of the invention but merely as providing illustrations of some of the presently preferred implementations of this invention. For example, although this method was described with reference to standard rectangular images, this method can be used to correct images of any shape or size. Additionally, although the method was described with reference to a particular correspondence method, other correspondence methods could be applied including correlation-based matching, MRF-based matching, feature-based matching and phase-scope matching. Thus the scope of the invention should be determined by the appended claims and their legal equivalents, rather than by examples given.

What is claimed is:

1. A method for locating matching points in two original images of a scene, a left image and a right image, such that the images have at least some overlap area, said method comprising:

selecting a first point within the overlap area in the right image;

running a first correspondence search using the first point to find a first matching point in the left image;

running a second correspondence search using the first matching point found by the first correspondence search to find a second matching point in the right image, wherein the second correspondence search is not run on any points to the left of the first point in the right image, and wherein a range of the second correspondence search is narrower than a range of the first correspondence search; and selecting a match point comprising the first matching point and second matching point.

2. The method of claim 1, wherein the step of selecting a match point comprises selecting only those match points in which the second matching point is the same as the first matching point.

3. The method of claim 1, wherein the step of running a first correspondence search comprises running a classic stereo correspondence search.

4. The method of claim 3, wherein the second correspondence search uses a different matching algorithm than the algorithm used in the first correspondence search.

5. The method of claim 1, wherein the step of running a first correspondence search comprises running a correlation-based matching algorithm.

6. The method of claim 1, wherein the step of running a first correspondence search comprises running a feature-based matching algorithm.

7. The method of claim 1, wherein the step of running a first correspondence search comprises running a phase-based matching algorithm.

8. The method of claim 1, wherein the step of running the first correspondence search comprises running the search in a first direction, and the step of running the second correspondence search comprises running the search in a second direction opposite the first direction.

9. A method for locating matching points in two original images of a scene, a left image and a right image, such that the images have at least some overlap area, said method comprising:

splitting the left image and the right image into left subimages and right subimages, respectively, wherein each subimage comprises the values of only one of the color coordinates used to define the image with which it is associated;

pairing each left subimage with the right subimage which uses the same color coordinate values;

running a first correspondence search using a first point in the right subimage to find a first matching point in the left subimage;

running a second correspondence search on the first matching point found by the first correspondence search to find a second matching point in the right subimage, wherein the second correspondence search is not run on any points to the left of the first point in the right subimage and wherein a range of the second correspondence search is narrower than a range of the first correspondence search;

selecting match points using the first matching point and the second matching point; and storing each selected match point in a list of match points.

10. The method of claim 9, further comprising, for each given point in the right subimage used in the correspondence search:

comparing the matching points stored in the list of match points that correspond to the given point across each subimage pair; and responsive to the matching points in the list of matching points being different for each subimage pair, removing the matching point from the list of match points.

11. The method of claim 10 further comprising the steps of:

retrieving a distance value which represents the distance between the camera location used to capture the right image and the camera location used to capture the left image; and creating a disparity map of the scene captured by the images by determining a disparity value for each point in the image, wherein values in the disparity map are calculated by using the distance between the match points that correspond to the point in the disparity distance map in the list of match points in conjunction with the retrieved value.

12. The method of claim 11, wherein the step of creating a disparity map further comprises the substep of, responsive to a given disparity map point not having any corresponding match points in the list of match points, using the first calculated disparity value to the right of the disparity map point as the disparity value.

13. The method of claim 12, wherein the substep of using the first calculated disparity value comprises the substep of, responsive to the images being stored in a color coordinate system that includes a brightness value, reducing the brightness value of the given disparity map point.

14. The method of claim 9, wherein the step of running a first correspondence search comprises running a classic stereo correspondence search.

15. The method of claim 14, wherein the second correspondence search uses a different matching algorithm than the algorithm used in the first correspondence search.

16. The method of claim 9, wherein the step of running a first correspondence search comprises running a correlation-based matching algorithm.

17. The method of claim 9, wherein the step of running a first correspondence search comprises running a feature-based matching algorithm.

18. The method of claim 9, wherein the step of running a first correspondence search comprises running a phase-based matching algorithm.

19. The method of claim 9, wherein the step of running the first correspondence search comprises running the search in a first direction, and the step of running the second correspondence search comprises running the search in a second direction opposite the first direction.

20. A system for locating matching points in two original images of a scene, a left image and a right image, such that the images have at least some overlap area, the system comprising:

a storage device for storing the images and executable code;

coupled to the storage device, means for selecting a first point within the overlap area in the right image;

coupled to the storage device, means for running a first correspondence search using the first point to find a first matching point in the left image;

coupled to the storage device, means for running a second correspondence search using the first matching point found by the first correspondence search to find a second matching point in the right image wherein the second correspondence search is not run on any points to the left of the first point in the right image and wherein a range of the second correspondence search is narrower than a range of the first correspondence search; and means for selecting match points using the first matching point and the second matching point.

21. The system of claim 20, wherein the means for running the first correspondence search comprises running the search in a first direction, and the means for running the second correspondence search comprises running the search in a second direction opposite the first direction.

22. A computer-readable medium containing a computer program for creating a list of match points in two images, said program containing instructions for directing the computer to execute the steps of:

splitting the left image and the right image into left subimages and right subimages, respectively, wherein each subimage comprises the values of only one of the color coordinates used to define the corresponding image;

pairing each left subimage with the right subimage which uses the same color coordinate values;

running a first correspondence search using a first point in the right subimage to find a first matching point in the left subimage;

running a second correspondence search on the first matching point found by the first correspondence search to find a second matching point in the right subimage, wherein the second correspondence search is not run on any points to the left of the first point in the right subimage and wherein a range of the second correspondence search is narrower than a range of the first correspondence search;

selecting match points using the first matching point and second matching point; and storing each selected match point in a list of match points.

23. The computer-readable medium of claim 22, wherein the step of running the first correspondence search comprises running the search in a first direction, and the step of running the second correspondence search comprises running the search in a second direction opposite the first direction.

* * * * *